United States Patent Office 2,984,149
Patented May 16, 1961

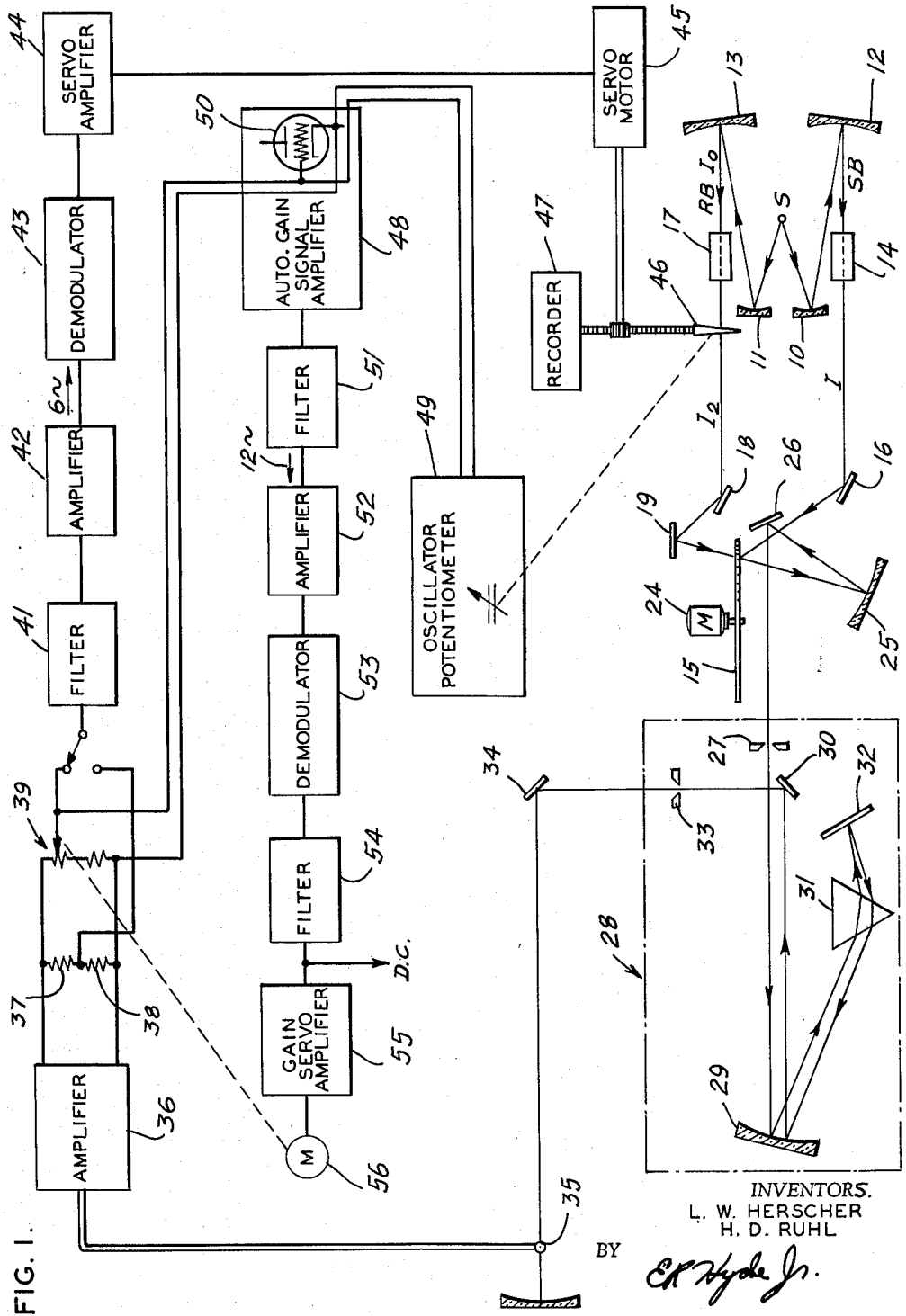
FIG. I.
INVENTORS.
L. W. HERSCHER
H. D. RUHL

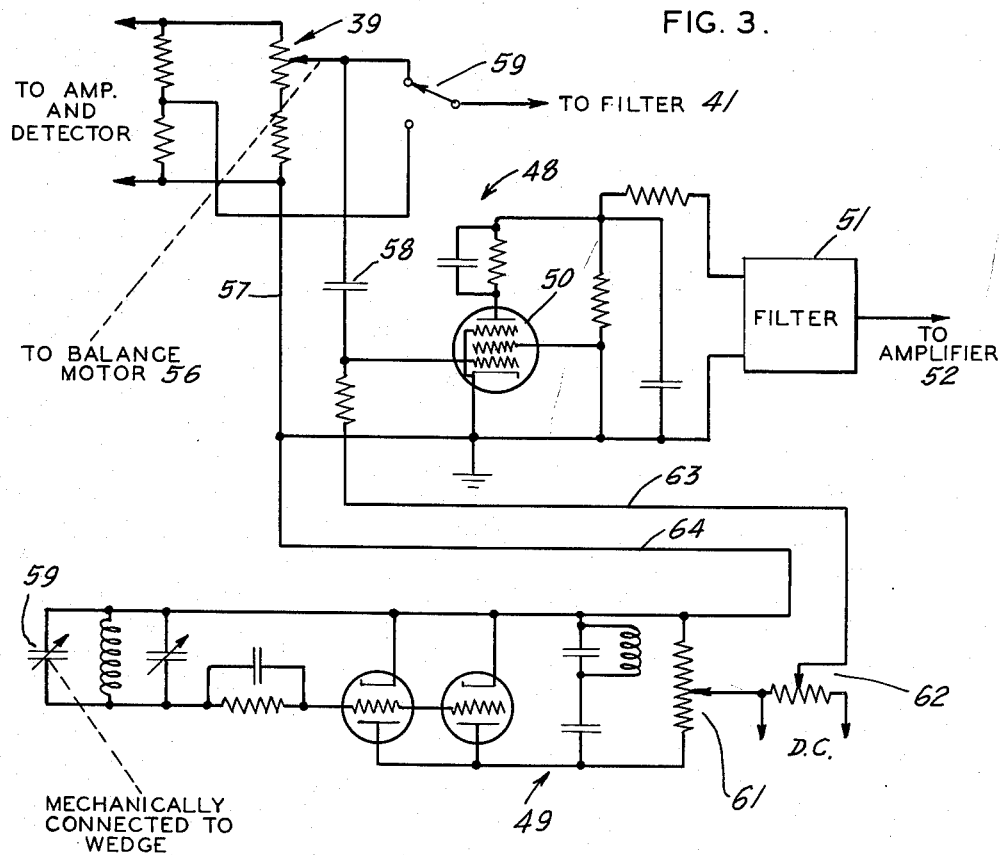
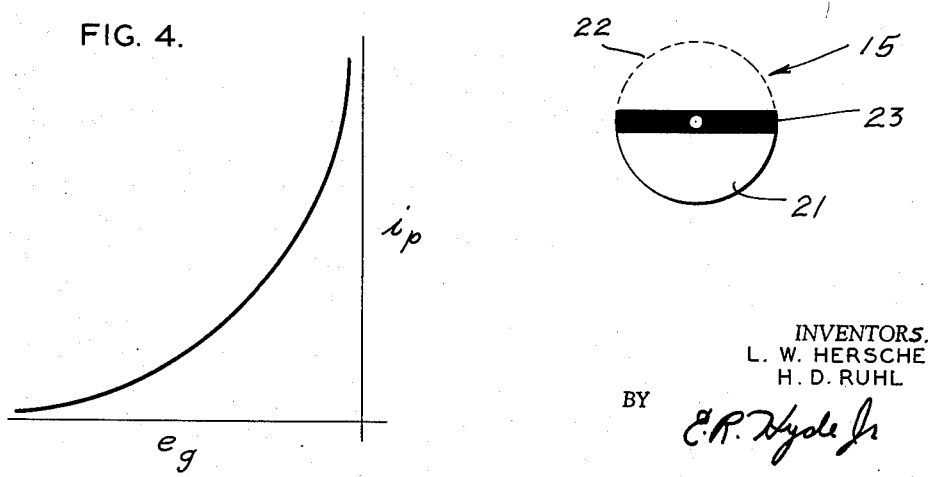

2,984,149

RADIATION COMPARISON SYSTEM

Leonard W. Herscher and Harry D. Ruhl, Midland, Mich., assignors to The Perkin-Elmer Corporation, Norwalk, Conn., a corporation of New York Filed Dec. 19, 1958, Ser. No. 781,646

10 Claims. (Cl. 88—14)

The present invention relates in general to radiation comparison systems and more particularly to a double beam radiation comparison system having means for measuring the intensity of the reference beam and using the result of this measurement in such a way as to enhance the performance of the system, as for example, with automatic gain control.

One type of system in use at the present time is the double beam optical null spectrophotometer. In this system a source of radiant energy is provided to supply a reference beam and a sample beam. A sample cell containing the material to be analyzed is interposed in the sample beam and selectively absorbs at certain wavelengths of the beam. The two beams are then alternately interrupted by a sector chopper and directed to the entrance slit of a monochromator. The latter contains a dispersing element such as a prism that spreads the beams out into a spectrum. A Littrow mirror then directs the spectrum to the monochromator exit slit from which the beams impinge on a radiation detector such as a thermocouple. The detector produces an output signal proportional to the intensity difference of the two beams at the selected wavelengths. This signal is then amplified and used to control a motor driven optical attenuator located in the reference beam. The attenuator will be positioned to equalize the intensity of the reference beam with that of the sample beam. At this position a null condition exists and the position of the attenuator will control a recorder pen resulting in a graphic presentation of the sample absorption at the different wavelengths.

Some prior art systems include a slit programming arrangement to compensate for intensity variations of the radiation source at different wavelengths. The programmer will vary the width of the monochromator slits in a predetermined manner in synchronization with the Littrow mirror whereby the slit is widened for wavelengths of less intensity and narrowed for wavelengths of greater intensity.

One of the primary sources of error in this type of feedback system is a change of loop gain which can cause improper response of the optical attenuator i.e. either a slowing down or sluggishness or excessive overshoot. This change can result, for example, from selective absorption of the reference beam. This is one of the general problems to which the present invention is directed.

Accordingly, the primary object of the present invention is to provide an improved radiation comparison system.

Another object of the present invention is to provide a signal which is proportional to the intensity of the reference beam of a double beam optical null radiation comparison system.

Another object of the present invention is to provide a double beam optical null radiation comparison system having automatic gain control.

Another object of the present invention is to provide a double beam optical null spectrophotometer in which the loop gain is maintained constant.

A further object of the present invention is to provide a signal proportional to the intensity of the reference beam of a double beam optical null radiation comparison system wherein the signal may be used to control the loop gain.

A further object of the present invention is to provide a signal proportional to the intensity of the reference beam of a double beam optical null radiation comparison system wherein the signal may be used to enhance the performance of the instrument.

Another object of the present invention is to provide a signal which is proportional to the intensity of the reference beam of a double beam optical null type spectrophotometer in spite of a varying amount of sample absorption.

In accordance with these and other objects, the present invention provides the sector chopper with two black (i.e. non-reflecting and/or non-transmitting) vanes at the crossover points in the beam flicker cycle. As a result, the beams are modulated not only at the beam flicker frequency but also at a frequency twice that of the beam flicker frequency. Thus the signal produced by the detector has an additional frequency superimposed upon the signal normally produced. This additional signal is proportional to the average intensity of the reference beam and sample beam at the detector and is passed to an amplifier tube of an automatic gain signal amplifier, the bias of which is controlled by the pen position of the recorder. In this manner the operating point and hence the gain of the amplifier tube is determined by the recorder pen position in such a way that the signal at the output of this amplifier is proportional to the intensity of the reference beam only. The superimposed signal is amplified, demodulated and compared with a fixed direct voltage source to control a gain servo motor which in turn controls the setting of a gain potentiometer. This potentiometer is interposed in the servo loop and serves to maintain constant loop gain.

The invention will be more fully understood from the following description of a specific embodiment thereof considered with the drawings in which Fig. 1 is a schematic diagram of the radiation comparison system of the present invention;

Fig. 2 is a view of the beam chopper;

Fig. 3 is a schematic diagram showing the gain potentiometer, automatic gain signal amplifier, and the bias source for the amplifier; and Fig. 4 is a curve showing the transfer characteristic of the gain signal amplifier.

Referring now to the drawings and more particularly to Fig. 1, S represents a source of radiation which may take the form of a glow bar providing infrared energy. It is, of course, understood that other radiation sources may be employed and the system is not limited to infrared radiation. The radiation from the source is formed into a reference beam RB and a sample beam SB by mirrors 10, 11, 12 and 13. The sample beam passes through a sample cell 14 containing the material being analyzed which may be in solution and is then directed to a sector chopper disc 15 by mirror 16. The reference beam RB passes through a reference cell 17 to compensate for the absorption of the solvent or other radiation intensity losses which may be caused by the presence of the sample cell, and is then directed to the chopper 15 by mirrors 18 and 19.

The chopper 15 as shown in Fig. 2 has a portion 21, which may be approximately 170°, whose outer surface is mirrored to reflect the sample beam. Another portion 22 of the chopper may be transparent or cut away to permit transmittance of the reference beam. A black strip portion 23 which may, for example, have a width of approximately 10° separates the reflective and transmitting portions of the chopper. Referring back to Fig. 1, it is seen that as the chopper disc 15 is rotated by motor 24 the reference beam will be reflected from mirror 19 to a mirror 25 during a portion of the cycle and will be cut off during another portion of the cycle when the sample beam is reflected from the surface 21 of the chopper to the mirror 25. It is seen, therefore, that mirror 25 receives the reference beam and sample beam alternately, at a frequency dependent upon the rotation of the chopper disc. In the embodiment herein described, this frequency may be considered as six c.p.s. Twice during each of these cycles both beams will be cut off by the dark portions 23 of the chopper at a frequency of twelve c.p.s. For purposes of description of six c.p.s. frequency will be referred to as the flicker frequency or signal and the twelve c.p.s. frequency as the gain control frequency or signal. From the mirror 25 the two beams follow an identical path throughout the rest of the system. Th beams are reflected by a mirror 26 to the entrance slit 27 of a monochromator generally indicated by numeral 28. It is of course understood that the exact type of monochromator or even the presence of the monochromator is not an essential part of the invention. From the entrance slit the beams are directed to a parabolic mirror 29 that serves to collimate the beams and direct them to a prism 31 which disperses them out into a spectrum received by a Littrow mirror 32. From the Littrow mirror the dispersed beams are directed back through the prism for a second dispersion and then reflect from the parabolic mirror 29 and mirror 32 through the exit slit 33 of the monochromator. This is generally known as a single pass monochromator. In some systems of this general type there is provision for a double pass of the beams through the prism and the features of the invention involving enchanced performance would be equally applicable in such a double pass system. The operation of the Littrow mirror may be mechanically synchronized with a recorder in a known manner. From the exit slit the beams are reflected by a suitable reflective device 34 to a thermocouple detector 35. It is, of course, understood that any suitable radiation detector which will produce a signal in accordance with the intensity of the impinging radiation may be employed.

The detector will produce a signal which will vary in accordance with the intensity of the radiant beams. The amplitude of the six c.p.s. signal representing the alternate reference beam RB and sample beam SB will be proportional to the intensity difference of the two beams. The amplitude of the superimposed gain signal of twelve c.p.s. will be proportional to the average intensity of these beams at the detector. The two signals from the detector are then passed to an amplifier 36 and will appear across resistors 37 and 38 connected across the amplifier output. A servo motor controlled gain potentiometer 39 is connected to the amplifier load resistors 37 and 38 and both signals will appear across the potentiometer. From the potentiometer 39 the signals are fed to a filter 41 which suppresses the twelve cycle signal and permits the six cycle signal to be amplified at 42. The output of amplifier 42 is then demodulated by a conventional unit 43 which may take the form of a synchronous rectifier. This signal is suitably amplified at 44 and serves to control a servo motor 45 to operate the reference beam attenuator 46. In this manner the reference beam intensity is attenuated to match the intensity of the sample beam. It is understood that the position of attenuator 46 represents the ratio of the respective intensities of the two beams. A recorder 47 is connected to respond to the position of the attenuator 46 so that the intensity of the sample beam with respect to the intensity of the reference beam may be graphically presented.

The potential appearing across the gain potentiometer 39 is also passed to the automatic gain signal amplifier 48. The first stage of this amplifier contains a remote cutoff pentode which will be considered in detail hereinafter. The control grid of the pentode connects to the potentiometer 39 and will receive the signal appearing across the potentiometer. The bias of the pentode is determined by the pen position of the recorder which is connected to an oscillator 49 to be described. The output of amplifier 48 is filtered at 51 to pass the twelve c.p.s. gain control signal and suppress the six c.p.s. flicker signal. The twelve c.p.s. gain control signal is then directed to an amplifier 52 and demodulated at 53. This demodulator may also be a synchronous rectifier to produce a direct voltage which is further filtered at 54. This direct voltage is then compared to a reference direct voltage and the difference is passed to a gain servo amplifier 55, the output of which controls the gain servo motor 56 which in turn operates to set the position of the gain potentiometer 39. In this manner the twelve c.p.s. signal at the output of the gain potentiometer is maintained at a constant level by the servo driven potentiometer which also controls the gain for the six c.p.s. flicker signal because both signals are common at the gain potentiometer. Also since the intensity of the twelve c.p.s. signal at the detector changes in proportion to the pen balance position, it is seen that the system is compensated by setting the gain of amplifier pentode 50 in accordance with the pen position.

Referring now to Fig. 3 there is shown the gain signal amplifier, gain potentiometer and bias arrangement. The grounded end of gain potentiometer 39 connects to the cathode of pentode 50 by wire 57 and the movable arm connects to the control grid through capacitor 58. A switch 59 is provided so that the automatic gain system may be switched off and the gain then controlled manually. The plate circuit of the pentode connects to the filter 51 which passes the twelve c.p.s. gain control signal.

As pointed out above, the grid bias of tube 50 is set in accordance with the pen position of the recorder. Accordingly, a tuned plate, tuned grid RF oscillator 49 is provided with a variable capacitor 59 mechanically connected to the recorder pen. The capacitor will be varied from minimum to maximum capacity as the pen moves from one end of the scale to the other. In this manner the current through a potentiometer 61 connected in the plate circuit of the oscillator will change in accordance with the pen position. The voltage appearing across the potentiometer 61 is added to a fixed direct voltage supply 62 and together serves as a bias connected between the control grid and cathode of tube 50 by wires 63 and 64.

In considering the operation of the automatic gain control feature it is understood that $I_0$ represents the intensity of the reference beam with no sample absorption, $I$ is the intensity of the sample beam and $I_2$ the intensity of the reference beam after attenuation by the compensation cell and attenuator 46. The twelve c.p.s. gain control signal is proportional to the average intensity of the two beams or $$\frac{I+I_2}{2}$$

In an optical null system of this general type the operation is such that the system is usually at or near a null condition and $I=I_2$. The gain control signal is therefore proportional to $$\frac{I+I}{2}$$

or $I$. In an optical null type instrument of this type the attenuator or pen position is proportional to $$\frac{I}{I_0}$$

It is desired to obtain a gain control signal which is proportional to the undesired variations of the reference beam $I_0$ due to atmospheric absorption or other causes. Mathematically this can be done by multiplying $$\frac{I_0}{I}$$

(the reciprocal of the pen position) by I (the twelve c.p.s. signal appearing at the gain potentiometer at the null condition).

This may be accomplished by the remote cut off pentode 50 and understood by reference to Fig. 4. The grid bias $e_g$ of tube 50 is determined by the attenuation of the reference beam by mechanically coupling the capacitor 59 to the recorder pen or attenuator 46. Thus the grid bias will vary as a function of $$\frac{I}{I_0}$$

Consider now a normal change in attenuator position because of sample absorption in the sample beam causing a decrease of reference beam intensity. The twelve c.p.s. signal developed at the detector would tend to decrease and the negative grid bias on the pentode would decrease. The operating point of the pentode would thereby move to a position of greater gain as shown by the slope of the curve and the decrease of the twelve c.p.s. gain control signal at the potentiometer 39 would be offset. The amplified gain control potentiometer would remain constant and the setting of the gain control potentiometer would remain unchanged. Considering a decrease of intensity of the reference and sample beams due to atmospheric absorption, for example, the twelve c.p.s. signal will decrease but the gain of the pentode 50 as determined by the attenuator or pen position will remain unchanged. Thus the decreased signal will be passed to the gain servo motor 56 to adjust the gain potentiometer to increase the loop gain. Thus the loop gain of the system is maintained constant regardless of undesired variations within the system.

In the above described embodiment of the gain control feature of the present invention there were considered variations of reference beam intensity due to atmospheric absorption. It is apparent that many other causes of change of the loop gain of the system such as source intensity variations, sensitivity changes of the detector, amplifier gain variations, non-perfect slit programming, compensating cell changes etc. would similarly effect the twelve c.p.s. gain control signal and would be compensated for.

It should also be understood that the gain servo motor could function to control the loop gain by means other than a gain potentiometer as above described. For example, a variable monochromator entrance slit could be provided and operated by the gain signal or the source intensity could be appropriately controlled.

It should also be understood that other methods of control, not requiring the use of a servo motor, can also be employed.

One particularly novel feature of the present invention is the obtaining of a signal which is proportional to the intensity of the reference beam $I_0$ in a double beam optical null radiation comparison system. It is apparent that this signal would serve to correct for intensity variations at the different wavelengths in a system wherein a slit programmer is not used for this purpose.

Although the present invention has been described with respect to a specific embodiment thereof, it is understood that various modifications could be made without departing from the scope of the invention as defined in the appended claims.

We claim:

1. In a radiation comparison system, a source of radiation providing a reference beam and a sample beam, shutter means to interrupt alternately said beams at a first frequency, detector means to receive said beams thereby producing first signal at said first frequency, attenuator means positioned to selectively attenuate said reference beam, means connecting said detector means to said attenuator means to balance the intensity of said reference beam with respect to said sample beam in accordance with said first signal, said shutter means having means to interrupt said beams at a secondary frequency whereby the detector produces a second signal at said second frequency, gain control means to adjust the gain of said system, means responsive to said second signal to produce a third signal proportional to the intensity of said reference beam and means responsive to said third signal to control said gain control means.

2. In a radiation comparison system, a source of radiation providing a reference beam and a sample beam, shutter means to interrupt alternately said beams at a first frequency, detector means to receive said beams thereby producing a first signal at said first frequency, means positioned to selectively attenuate said reference beam, means connecting said detector means to said attenuator means to balance the intensity of said reference beam with respect to said sample beam, said shutter means having means to interrupt said beams at a second frequency whereby the detector produces a second signal at said second frequency, gain control means interposed in said system, automatic gain signal producing means connected to control said gain control means, means to apply said second signal to the automatic gain signal producing means, means to produce a third signal corresponding to the position of said attenuator, means to apply said third signal to the automatic gain signal producing means thereby to control said gain control means.

3. In a radiation comparison system, a source of radiation providing a reference beam and a sample beam, shutter means to interrupt alternately said beams at a first frequency, detector means to receive said beams thereby producing a first signal at said first frequency, attenuator means positioned to selectively attenuate said reference beam, means connecting said detector means to said attenuator means to balance the intensity of said reference beam with respect to said sample beam in accordance with said first signal, said shutter means having means to interrupt said beams at a second frequency whereby the detector produces a second signal at said second frequency, gain control means interposed in said system, signal producing means having an input and an output, means connecting the output of said signal producing means to said gain control means, means to apply said second signal to the input of said gain control means, means to produce a third signal corresponding to the position of said attenuator means, means to apply said third signal to the input of said signal producing means whereby the gain of said system is automatically controlled.

4. In a radiation comparison system, a source of radiation providing a reference beam and a sample beam, shutter means to interrupt alternately said beams at a first frequency, detector means to receive said beams thereby producing a first signal at said first frequency, attenuator means positioned to selectively attenuate the reference beam, means connecting said detector means to said attenuator means to balance the intensity of said reference beam with respect to said sample beam, said shutter means having means to interrupt said beams at a second frequency whereby the detector produces a second signal at said second frequency, gain control means to adjust the gain of said system, means responsive to said second signal to produce a third signal proportional to the intensity of said reference beam, means to compare said third signal to a fixed reference signal, and means whereby said gain control means is responsive to changes in the difference between said third signal and said reference signal to maintain a constant loop gain of said system.

5. In a radiation comparison system, a source of radiation providing a reference beam and a sample beam, shutter means to interrupt alternately said beams at a first frequency, detector means to receive said beams thereby producing a first signal at said first frequency, attenuator means positioned to selectively attenuate the reference beam, means connecting said detector means to said attenuator means to balance the intensity of said reference beam with respect to said sample beam, said shutter means having means to interrupt said beams at a second frequency whereby the detector produces a second signal at said second frequency, gain control means to adjust the loop gain of said system, control means connected to said gain control means, means to apply said second signal to said control means, means to produce a third signal corresponding to the position of said attenuator, means to apply said third signal to the control means whereby substantially constant loop gain of said system is maintained.

6. A double beam optical null spectrophotometer system comprising a radiation source providing a reference beam and a sample beam, beam chopper means, means to direct said beams to said chopper means whereby said beams are interrupted alternately at a first frequency and directed along a common path, monochromator having an entrance slit located in said common path, said monochromator including dispersing means, an exit slit and means to direct narrow wavelengths bands through said exit slit, radiation detector means to produce an electrical signal in accordance with the intensity of radiant energy impinging thereon, means to direct the narrow wavelength bands from said exit slit to the detector means thereby producing a signal having a first component at said first frequency, means to demodulate said first component, adjustable attenuator means adapted to be selectively positioned in said reference beam, motor means connected to said demodulator means and to said attenuator means to balance the intensity of said reference beam with respect to said sample beam in accordance with the first component of said signal, means to interrupt both of said beams at a second frequency whereby the signal produced at said detector means contains a second component at said second frequency, gain control means interposed in said system whereby said first and second signal components appear thereacross, amplifier means connected to said gain control means, means connecting said attenuator means to said amplifier means whereby the amplifier gain is a function of said reference beam intensity and means connected to said amplifier output to control the gain control means to maintain a constant system gain.

7. A double beam optical null spectrophotometer system comprising a radiation source providing a reference beam and a sample beam, beam chopper means, means to direct said beams to said chopper means whereby said beams are interrupted alternately at a first frequency and directed along a common path, a monochromator having an entrance slit located in said common path, said monochromator including dispersing means, an exit slit and means to direct narrow wavelengths bands through said exit slit, radiation detector means to produce an electrical signal in accordance with the intensity of radiant energy impinging thereon, means to direct the narrow wavelength bands from said exit slit to the detector means thereby producing a signal having a first component at said first frequency, means to demodulate said first component, adjustable attenuator means adapted to be selectively positioned in said reference beam, first motor means connected to said demodulator means and to said attenuator means to balance the intensity of said reference beam with respect to said sample beam in accordance with the first component of said signal, means to interrupt both of said beams at a second frequency whereby the signal produced at said detector means contains a second component at said second frequency, gain control means interposed in said system whereby said first and second signal components appear thereacross, amplifier means connected to said gain control means, means connecting said attenuator means to said amplifier means whereby the amplifier gain is a function of said reference beam intensity and means including second motor means connected to said amplifier output to control the gain control means thereby maintaining a constant system gain.

8. A double beam optical null spectrophotometer system comprising a radiation source providing a reference beam and a sample beam, beam chopper means, means to direct said beams to said chopper means whereby said beams are interrupted alternately at a first frequency and directed along a common path, a monochromator having an entrance slit located in said common path, said monochromator including dispersing means, an exit slit and means to direct narrow wavelengths bands through said exit slit, radiation detector means to produce an electrical signal in accordance with the intensity of radiant energy impinging thereon, means to direct the narrow wavelength bands from said exit slit to the detector means thereby producing a signal having a first component at said first frequency, means to demodulate said first component, adjustable attenuator means adapted to be selectively positioned in said reference beam, first motor means connected to said demodulator means and to said attenuator means to balance the intensity of said reference beam with respect to said sample beam in accordance with the first component of said signal, means to interrupt both of said beams at a second frequency whereby the signal produced at said detector means contains a second component at said second frequency, a gain control potentiometer interposed in said system whereby said first and second signal components appear thereacross, automatic gain signal amplifier means connected to said potentiometer whereby the second signal component is applied to the input of the amplifier means, means connecting said attenuator means to said amplifier means whereby the gain of said amplifier means is a function of the attenuator position, means including second motor means connected to said amplifier output to control the gain potentiometer to maintain a constant system gain.

9. A double beam optical null spectrophotometer system comprising a radiation source providing a reference beam and a sample beam, beam chopper means, means to direct said beams to said chopper means whereby said beams are interrupted alternately at a first frequency and directed along a common path, a monochromator having an entrance slit located in said common path, said monochromator including dispersing means, an exit slit and means to direct narrow wavelengths bands through said exit slit, radiation detector means to produce an electrical signal in accordance with the intensity of radiant energy impinging thereon, means to direct the narrow wavelength bands from said exit slit to the detector means thereby producing a signal having a first component at said first frequency, means to demodulate said first component, adjustable attenuator means adapted to be selectively positioned in said reference beam, first motor means connected to said demodulator means and to said attenuator means to balance the intensity of said reference beam with respect to said sample beam in accordance with the first component of said signal, means to interrupt both of said beams at a second frequency whereby the signal produced at said detector means contains a second component at said second frequency, a gain control potentiometer interposed in said system whereby said first and second signal components appear thereacross, automatic gain signal amplifier means, including a remote cutoff pentode, means connecting the potential across said potentiometer to the control electrode of said pentode, means to produce a third signal in accordance with the position of said attenuator, means to apply said third signal to the pentode to control the grid bias thereof whereby the gain of said amplifier means is a function of the attenuator position and means including second motor means connected to the amplifier output to adjust said gain potentiometer to maintain a constant system gain.

10. In a radiation comparison system a source of radiation providing a reference beam and a sample beam, shutter means to alternately interrupt said beams at a first frequency, detector means to receive said beams thereby producing a first signal at said first frequency, attenuator means positioned to selectively attenuate the reference beam, means connecting the output of said detector means to said attenuator means to balance the intensity of said reference beam with respect to said sample beam in accordance with said first signal, said means connecting the output of said detector means to said attenuator means including filter means to pass said first signal, said shutter means having means to interrupt said beam at a second frequency whereby the detector produces a second signal at said second frequency, control means to adjust the loop gain of said system, means including amplifier means connected to adjust said control means, means to apply said second signal to said amplifier means, means to produce a third signal in accordance with the position of said attenuator, means to apply said third signal to said amplifier means thereby to control the gain of said system.

References Cited in the file of this patent

UNITED STATES PATENTS

| | | |
|---|---|---|
| 2,678,581 | Reisner | May 18, 1954 |
| 2,817,769 | Siegler et al. | Dec. 24, 1957 |